(12) United States Patent
Takata

(10) Patent No.: US 8,488,170 B2
(45) Date of Patent: Jul. 16, 2013

(54) PRINT JOB MANAGEMENT APPARATUS, SYSTEM, AND METHOD

(75) Inventor: Tadahiro Takata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 355 days.

(21) Appl. No.: 12/968,362

(22) Filed: Dec. 15, 2010

(65) Prior Publication Data

US 2011/0149345 A1    Jun. 23, 2011

(30) Foreign Application Priority Data

Dec. 21, 2009    (JP) .................................. 2009-289537

(51) Int. Cl.
*G06F 15/00*    (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| 2007/0013962 | A1* | 1/2007 | Hayashi ...................... 358/403 |
| 2007/0146778 | A1 | 6/2007 | Kitagata et al. |
| 2009/0077164 | A1 | 3/2009 | Phillips et al. |
| 2009/0077165 | A1 | 3/2009 | Rhodes et al. |
| 2009/0077216 | A1 | 3/2009 | Rhodes et al. |

FOREIGN PATENT DOCUMENTS

| EP | 1 621 994 A1 | 2/2006 |
| EP | 1 628 204 A1 | 2/2006 |
| JP | 2006-085625 | 3/2006 |
| JP | 2007-200284 | 8/2007 |
| JP | 4168856 | 10/2008 |
| JP | 2009 037488 A | 2/2009 |
| JP | 2009-070386 | 4/2009 |
| JP | 2009-124346 | 6/2009 |

OTHER PUBLICATIONS

Extended European Search Report dated Sep. 3, 2012.

\* cited by examiner

*Primary Examiner* — Saeid Ebrahimi Dehkordy
(74) *Attorney, Agent, or Firm* — IPUSA, PLLC

(57) ABSTRACT

A disclosed print job management apparatus includes a job registering unit configured to associate the print setup information with first identifiers, associate the print data with second identifiers formed by adding predetermined symbols to the first identifiers, record the print setup information and the print data in a job information storing unit, and return the first identifiers to the print requesting unit, a job list providing unit configured to return a list of the first identifiers to an image forming apparatus, a job transferring unit configured to return the print setup information associated with the requested one of the first identifiers and the print data associated with the second identifiers corresponding to the requested one of the first identifiers, and a job changing unit configured to change the print setup information recorded in the job information storing unit with the part of the print setup information.

15 Claims, 19 Drawing Sheets

FIG.7

WIDGET MANAGER URI: http://<ADDRESS>:<PORT NUMBER>/widgets/ ~401

WIDGET URI (A) : http://<ADDRESS>:<PORT NUMBER>/widgets/<WIDGET ID_A> ~410
└─ PRINT JOB URI (1) : http://<ADDRESS>:<PORT NUMBER>/widgets/<WIDGET ID_A>/jobs/<JOB ID_(1)> ~411
└─ PRINT JOB URI (2) : http://<ADDRESS>:<PORT NUMBER>/widgets/<WIDGET ID_A>/jobs/<JOB ID_(2)> ~412
└─ PRINT JOB URI (3) : http://<ADDRESS>:<PORT NUMBER>/widgets/<WIDGET ID_A>/jobs/<JOB ID_(3)> ~413

WIDGET URI (B) : http://<ADDRESS>:<PORT NUMBER>/widgets/<WIDGET ID_B> ~420
└─ PRINT JOB URI (1) : http://<ADDRESS>:<PORT NUMBER>/widgets/<WIDGET ID_B>/jobs/<JOB ID_(1)> ~421
└─ PRINT JOB URI (2) : http://<ADDRESS>:<PORT NUMBER>/widgets/<WIDGET ID_B>/jobs/<JOB ID_(2)> ~422
└─ PRINT JOB URI (3) : http://<ADDRESS>:<PORT NUMBER>/widgets/<WIDGET ID_B>/jobs/<JOB ID_(3)> ~423

WIDGET URI (C) : http://<ADDRESS>:<PORT NUMBER>/widgets/<WIDGET ID_C> ~430
└─ PRINT JOB URI (1) : http://<ADDRESS>:<PORT NUMBER>/widgets/<WIDGET ID_C>/jobs/<JOB ID_(1)> ~431
└─ PRINT JOB URI (2) : http://<ADDRESS>:<PORT NUMBER>/widgets/<WIDGET ID_C>/jobs/<JOB ID_(2)> ~432
└─ PRINT JOB URI (3) : http://<ADDRESS>:<PORT NUMBER>/widgets/<WIDGET ID_C>/jobs/<JOB ID_(3)> ~433

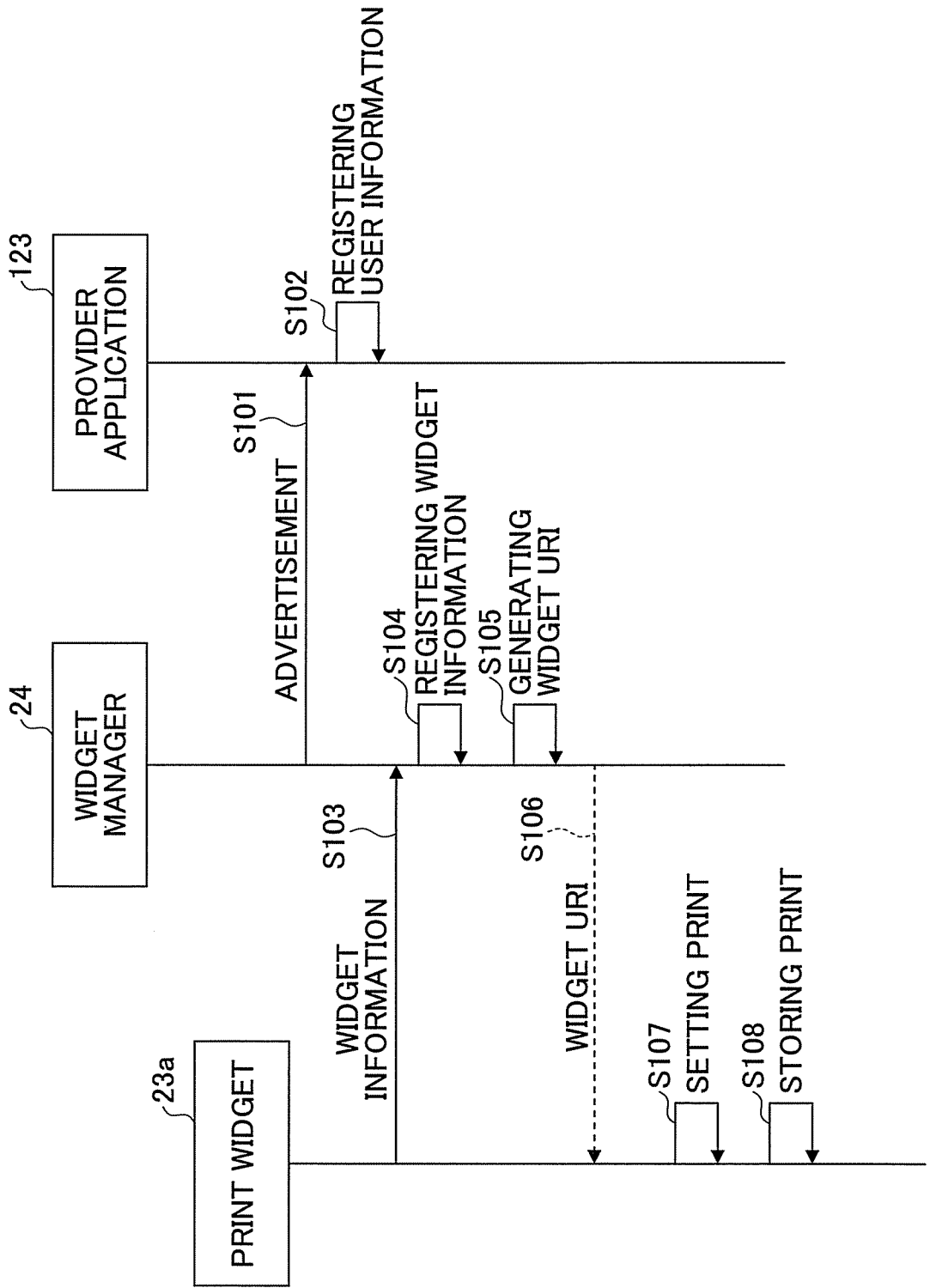

FIG.9

| USER ID | WIDGET MANAGER URI |
|---------|--------------------|
| USER A  | http://xxxxx:yyyy/widgets/ |
|         |                    |
|         |                    |

POST /widgets HTTP/1.1
Content-Type: application/x-www-form-urlencoded
Host: 192.168.XXX.XXX:8080
Content-Length: XXX id=94d5dd11&name=printClient&function=print&····   d13

FIG.11

| WIDGET ID | 94d5dd11 |
|---|---|
| WIDGET NAME | printClient |
| COOPERATING FUNCTION IDENTIFIER | print |
| INDICATING NAME | PRINT A |
| : | : |

```
HTTP/1.1 201 Created
Content-type: application/x-www-form-urlencoded
Content-length: 0
Location: http://192.168.XXX.XXX:8080/widgets/94d5dd11
```
d21

FIG.16

```
HTTP/1.1 201 Created
Content-type: application/x-www-form-urlencoded
Content-length: 0
Location: http://192.168.XXX.XXX: 8080/widgets/94d5dd11/jobs/67ae2c2     ----d41
```
~Rs2

FIG.19

```
Rq3
       d51     d52
       PUT /widgets/94d5dd11/jobs/67ae2c2 HTTP/1.1
       Content-Type: application/x-www-form-urlencoded
       Host: 192.168.XXX.XXX:8080
       Content-Length: XX                        d53 chromaticity=MONO&number_up=2&sides=BOTH_SIDED&copies=3
```

FIG.20

```
Rq4
       d61     d62
       PUT /widgets/94d5dd11/jobs/67ae2c2/file HTTP/1.1
       Content-Type: application/pdf
       Accept-Encoding: gzip, deflate
       Host: 192.168.XXX.XXX:8080
       Content-Length: XX <PRINT DATA···>   ---d63
```

FIG.22

```
 d71            d72                                  Rq5
 ┌──────────────────────────────────────────────────┐
 │ DELETE /widgets/94d5dd11/jobs/67ae2c2 HTTP/1.1   │
 │ Content-Type: application/x-www-form-urlencoded  │
 │ Host: 192.168.XXX.XXX:8080                       │
 │ Content-Length: XX                               │
 └──────────────────────────────────────────────────┘
```

PRINT JOB MANAGEMENT APPARATUS, SYSTEM, AND METHOD

BACKGROUND OF THE INVENTION

1. Field of the Invention

The present invention relates to a print job management apparatus, a print job management system, a print job management method, and a print job management program.

2. Description of the Related Art

An example of a print server is positioned between a client PC and an image forming apparatus, accumulates print jobs transmitted from the client PC, and transfers the accumulated print jobs upon request of the image forming apparatus as disclosed in Patent Document 1. A user inputs a print instruction into the client PC in a printing system including a print server. The client PC transmits the print job corresponding to the print instruction. The print server does not directly transfer the print job to the image forming apparatus and accumulates in a memory device such as a hard disk drive (HDD). Thereafter, the user operates the image forming apparatus and instructs printing of the accumulated print job. The image forming apparatus acquires the print job from the print server in response to the instruction and prints a document or the like of the print job.

However, when a print mode desired by the user is changed before the image forming apparatus instructs a print output for the print job registered in the print server, it is not possible to conform to the changed print mode. More specifically, when the print mode of the print job registered in the print server is changed, the user deletes the print job from the print server, activates an application for the document data to be printed, changes the print setup corresponding to the print mode, and instructs the printer to print the print document.

Patent Document 1: Japanese Laid-Open Patent Application No. 2007-200284

SUMMARY OF THE INVENTION

Accordingly, the embodiment of the present invention provides a novel and useful print job management apparatus, print job management system, print job management method, and print job management program solving one or more of the problems discussed above by improving operability of print jobs.

One aspect of the embodiments of the present invention may be to provide a print job management apparatus including a job registering unit configured, in response to a request of a print requesting unit for registering print jobs including print setup information pieces and print data, to associate the print setup information pieces with first identifiers, associate the print data with second identifiers formed by adding predetermined symbols to the first identifiers, record the print setup information pieces and the print data in a job information storing unit, and return the first identifiers to the print requesting unit; a job list providing unit configured, in response to a request of an image forming apparatus connected to the print job management apparatus via a network for acquiring a list of the print jobs, to return a list of the first identifiers; a job transferring unit configured, in response to a request for acquiring the print job corresponding to one of the first identifiers selected from the list by the image forming apparatus, to return the print setup information piece associated with the requested one of the first identifiers and the print data associated with the second identifiers corresponding to the requested one of the first identifiers; a job changing unit configured, in response to a request for changing at least a part of the print setup information piece associated with the first identifier which is received from the print requesting unit, to change the print setup information piece recorded in the job information storing unit with the part of the print setup information piece.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 7 illustrates example contents of the widget URIs.

FIG. 8 is a sequence diagram illustrating procedures in activating the widget manager and the print widget.

FIG. 9 illustrates a structural example of a user information table.

FIG. 10 illustrates an example request for registering a widget information piece.

FIG. 11 illustrates a structural example of the widget information piece of the print widget.

FIG. 12 illustrates an example response to the request for registering the widget information piece.

FIG. 16 illustrates an example response to a request for registering the print job information.

FIG. 19 illustrates an example request for changing the print job information when the print setup information is changed.

FIG. 20 illustrates an example request for changing the print job information when the print data is changed.

FIG. 22 illustrates an example request for deleting the print job information.

DETAILED DESCRIPTION OF THE PREFERRED EMBODIMENTS

A description is given below, with reference to the FIG. 1 through FIG. 22 of the Embodiments of the present invention.

Figure 1:
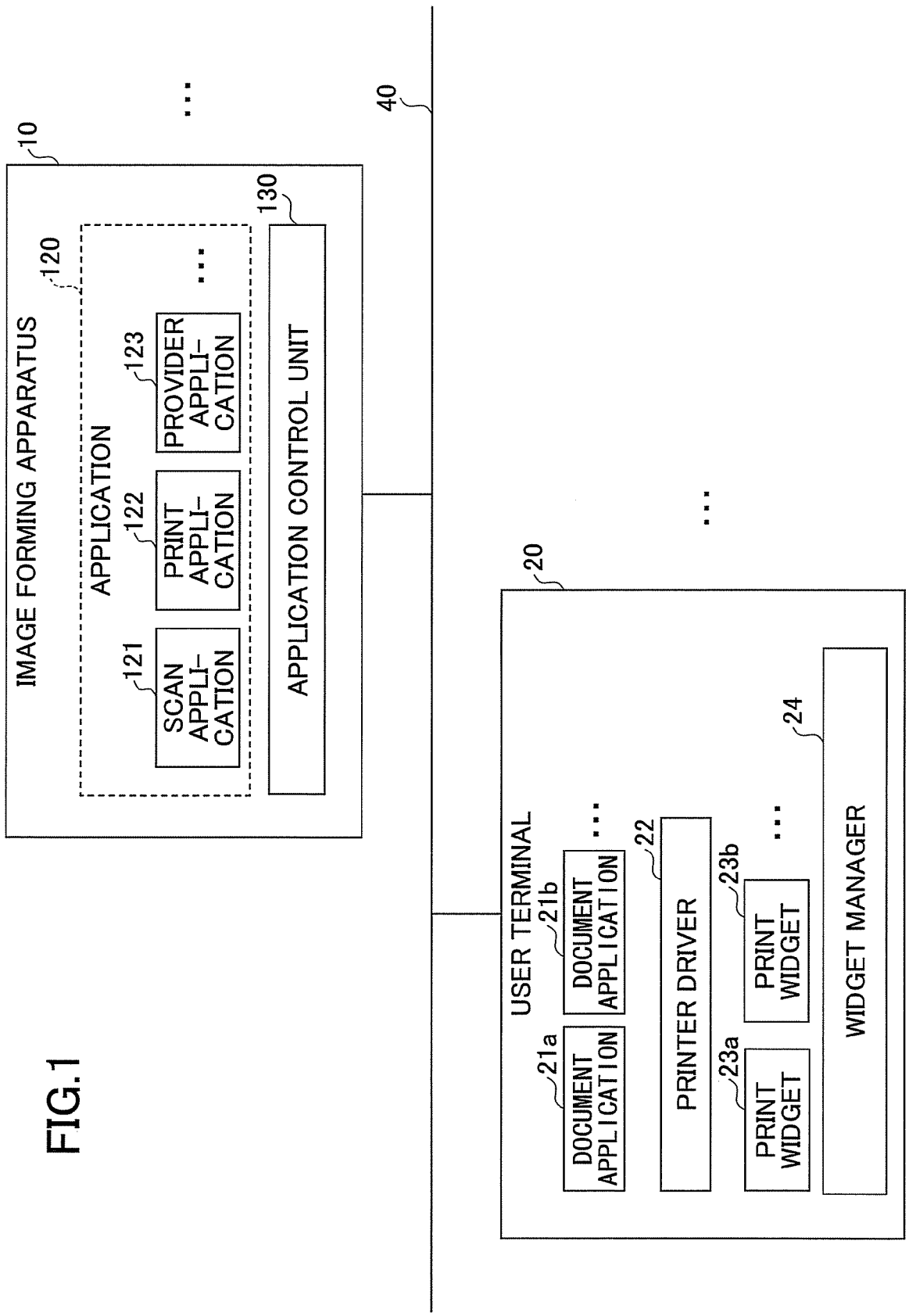
FIG. 1 illustrating an example configuration of an information processing system of an Embodiment.

Hereinafter, the Embodiment is described with reference to FIG. 1 through FIG. 22. FIG. 1 illustrating an example configuration of an information processing system of the Embodiment. In the information processing system 1 of FIG. 1, one or more image forming apparatuses 10 and one or more user terminals 20 are connected so as to be mutually communicated via a wired or wireless network 40 such as a local area network (LAN).

The user terminals 20 are personally used by users. Software programs may be installed and implemented in the user terminals 20. The user terminals 20 are not specifically limited as long as communication functions are provided. An example of the user terminals 20 is a desktop personal computer (PC), a notebook personal computer, a personal digital assistance (PDA), a mobile phone, or the like.

Referring to FIG. 1, the user terminal 20 includes one or more document applications 21 such as a document application 21a and a document application 21b, a printer driver 22, plural widgets 23 such as a print widget 23a and a print widget 23b, a widget manager 24, or the like.

The document application 21 includes an application for producing document data to be printed such as word processor software and spreadsheet software. The printer driver 22 converts document data to print data which can be comprehended by the image forming apparatus 10 such as a Page Description Language (PDL) data, a Portable Document Format (PDF) data, and a Tagged Image File Format (TIFF). In an embodiment, the printer driver 22 is set up to output generated print data as a file having a predetermined file name without outputting the generated print data to a port corresponding to the image forming apparatus 10 or a port to be connected to the mage forming apparatus 10 such as a printer port or a standard TCP/IP port.

The print widget 23 is one mode of the application program collectively referred to as "widget" in the Embodiment. In recent years, a convenient application program called widget or gadget circulates in a marketplace. In the Embodiment, a terminology "widget" is used to represent a characteristic enabling to be easily installed. This terminology is used without limiting any technical feature of "widget". The widget of the Embodiment remotely uses the function of the image forming apparatus 10 and provides a predetermined service (for example, a sequence of processes such as a work flow) to the user. For example, the print widget 23 carries out a process of printing input data with the image forming apparatus 10. It is an example of a print requesting unit of claims.

Although not illustrated, a scan widget may further exist. The scan widget causes the image forming apparatus 10 to scan a document or the like, store the scanned image data into the user terminal 20, or process to deliver the scanned image data.

The widget manager 24 is a framework of the widget. The widget manager intermediates between the widget and the image forming apparatus 10. Each widget has an interface determined by the widget manager 24 and a procedure determined by the widget manager 24. Said differently, the program operated in coordination with the widget manager 24 is the widget of the Embodiment. With the Embodiment, the print widget 23 requests to register the print job to the widget manager 24. The widget manager 24 stores or accumulates information (print setup information, print data or the like) related to the print job requested to be registered.

The image forming apparatus 10 is a multifunction peripheral which can realize at least two of functions of printing, scanning, copying, and a FAX transmission within one casing. However, a printer without having the functions of scanning, copying, and fax transmission may be used instead of the image forming apparatus 10.

Referring to FIG. 1, the image forming apparatus 10 has software such as an application 120 and an application control unit 130. The application 120 is a program which carries out the job requested by the user. Further, a scan application 121, a print application 122, and a provider application 123 are exemplified as the application 120. The scan application 121 carries out a scanning job. The print application 122 carries out print jobs. The provider application 123 carries out a process for cooperating the image forming apparatus 10 with the widget or the widget manager 24. For example, the provider application 123 acquires the print job registered in the widget manager 24 and causes the image forming apparatus 10 to carry out the print job.

The application control unit 130 intermediates between the applications 120. For example, the application control unit 130 switches the active application 120 in response to the operation instruction from the user. An operation screen of the active application 120 is displayed on an operations panel of the image forming apparatus 10. The active application 120 may be operated via the operations panel.

Figure 2:
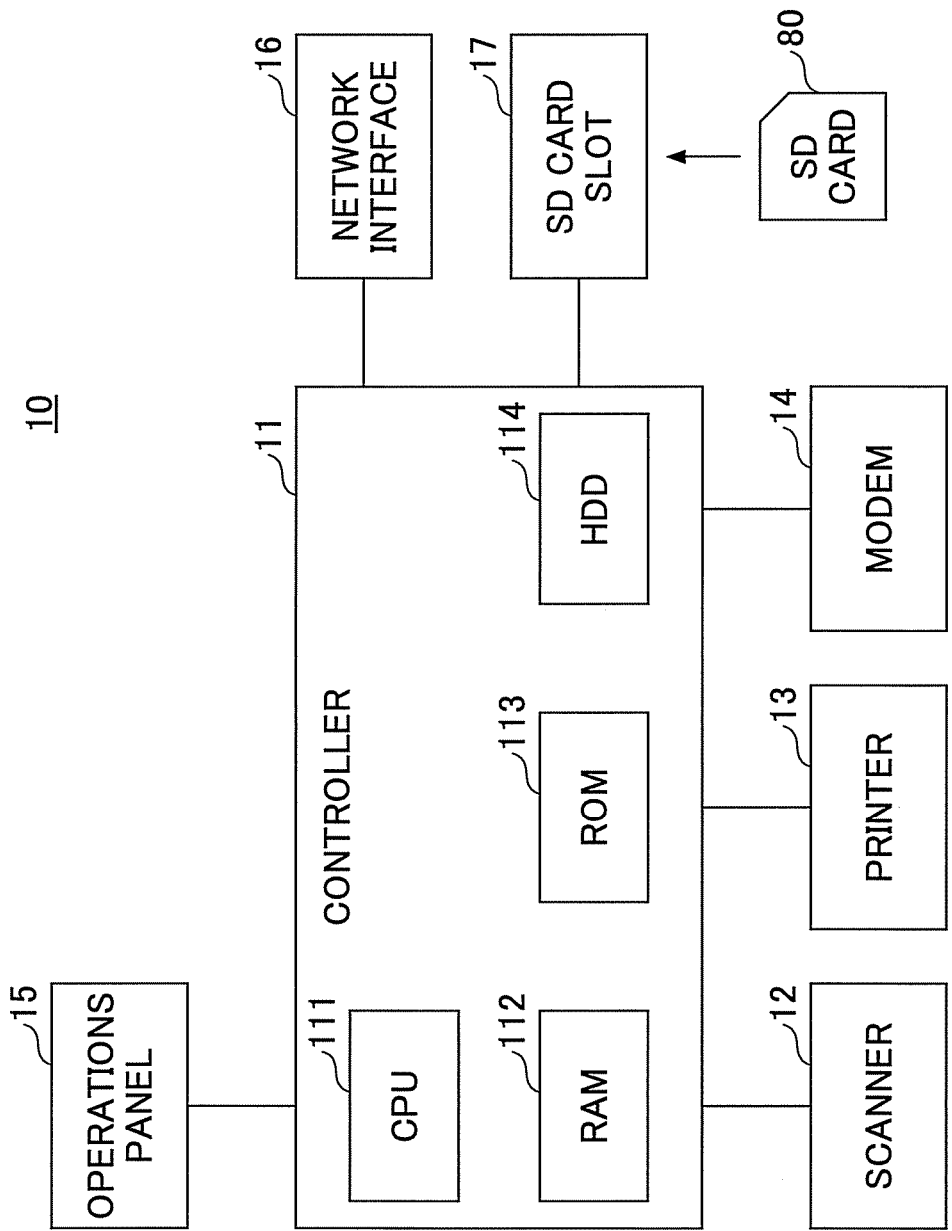
FIG. 2 illustrates an example hardware configuration of an image forming apparatus of the Embodiment.

Next, hardware configurations of the various apparatuses and devices are described. FIG. 2 illustrates an example hardware configuration of the image forming apparatus of the Embodiment. Referring to FIG. 2, the image forming apparatus 10 includes hardware such as a controller 11, a scanner 12, a printer 13, a modem 14, an operations panel 15, a network interface 16, and an SD card slot 17.

The controller 11 includes a CPU 111, a RAM 112, a ROM 113, an HDD 114, and so on. Various programs and data used by the various programs are stored in the ROM 113. The RAM 112 is used as a memory area for loading the programs, a work area for the loaded programs, or the like. The CPU 111 demonstrates various functions by processing the programs loaded into the RAM 112. The HDD 114 records programs, various data used by the programs, or the like.

The scanner is hardware for reading image data from a manuscript. The printer 13 is hardware for printing the print data on a print paper. The modem 14 is hardware for connecting the image forming apparatus 10 to a telecommunication line (not illustrated) and is used for sending and receiving the image data with fax communications. The operations panel 15 is hardware provided with an input unit for receiving an input from a user such as a button and a display unit such as a liquid crystal panel. The network interface 16 is hardware for connecting the image forming apparatus 10 to a wired or wireless network such as LAN. The SD card slot 17 is used to read a program recorded in the SD card 80. Said differently, not only the programs stored in the ROM 113 but also the programs stored in the SD card 80 may be loaded into the RAM 112 and executed by the image forming apparatus 10.

Figure 3:
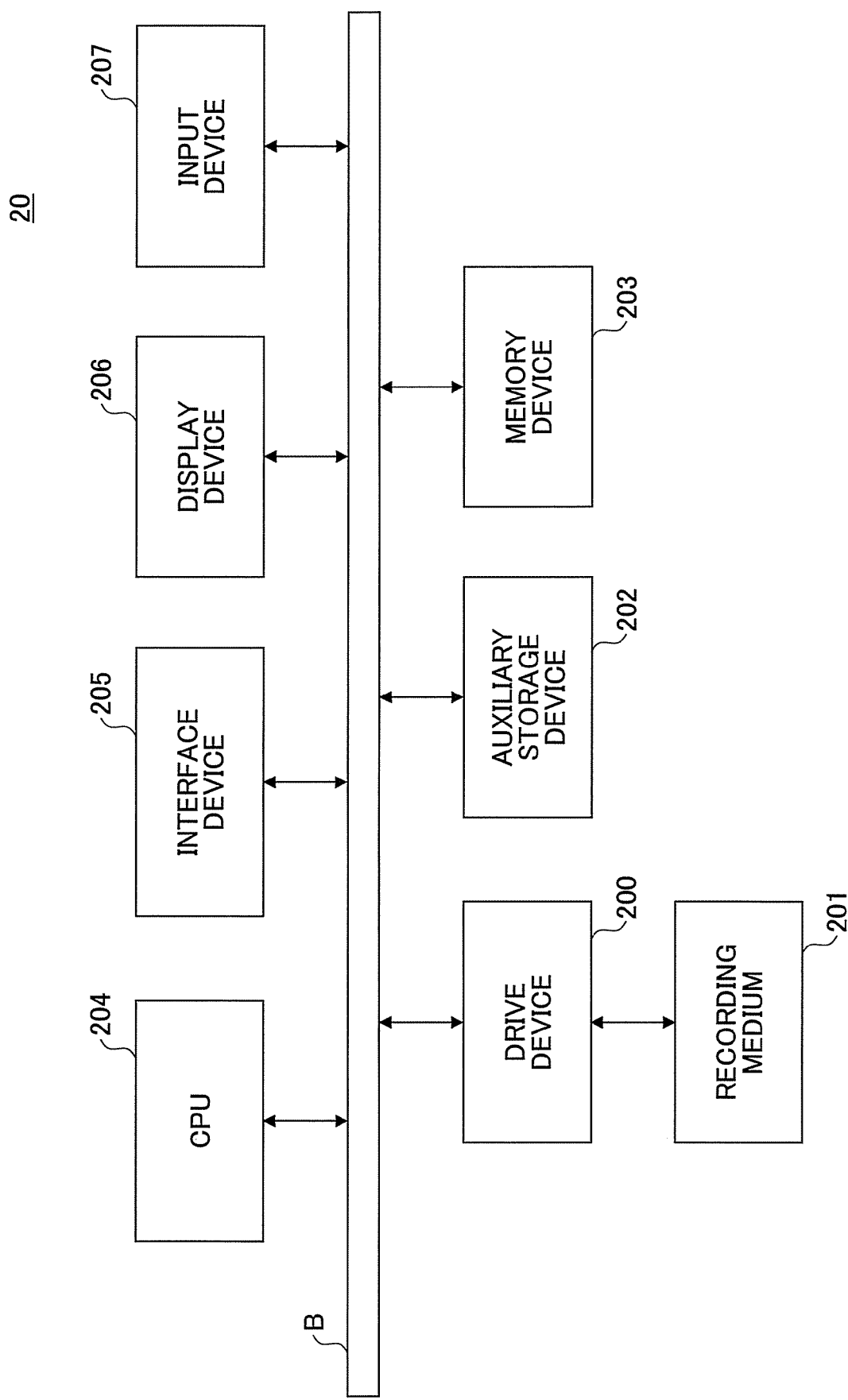
FIG. 3 illustrates a hardware configuration example of a user terminal of the Embodiment.

FIG. 3 illustrates a hardware configuration example of a user terminal of the Embodiment Referring to FIG. 3, the user terminal 20 includes a drive device 200, an auxiliary storage device 202, a memory device 203, a CPU 204, an interface device 205, a display unit 206, and an input unit 207, which are mutually connected by a bus B.

A program realizing processes in the user terminal 20 is supplied by a recording medium 201 such as CD-ROM. When the recording medium 201 with the program recorded on it is installed in the driving device 200, the program is installed in the auxiliary storage device 202 via the drive device 200. However, the program needs not to be always installed from the recording medium 201 and may be downloaded from another computer via the network. The auxiliary storage device 202 stores necessary files, data and so on in addition to the installed program.

The memory device 203 reads out the program from the auxiliary storage device 202 when the program is instructed to be activated and stores the program in the memory device 203. The CPU 204 realizes a function related to the user terminal 20 in conformity with the program stored in the memory device 203. The interface device 205 is used as an interface for connecting to the network. The display device 206 displays a Graphical User Interface (GUI) or the like generated by the program. The input device 207 is configured to include a keyboard, a mouse or the like, and used to input various operational instructions.

The print widget 23, the widget manager 24, and the provider application 123 are described in detail.

Figure 4:
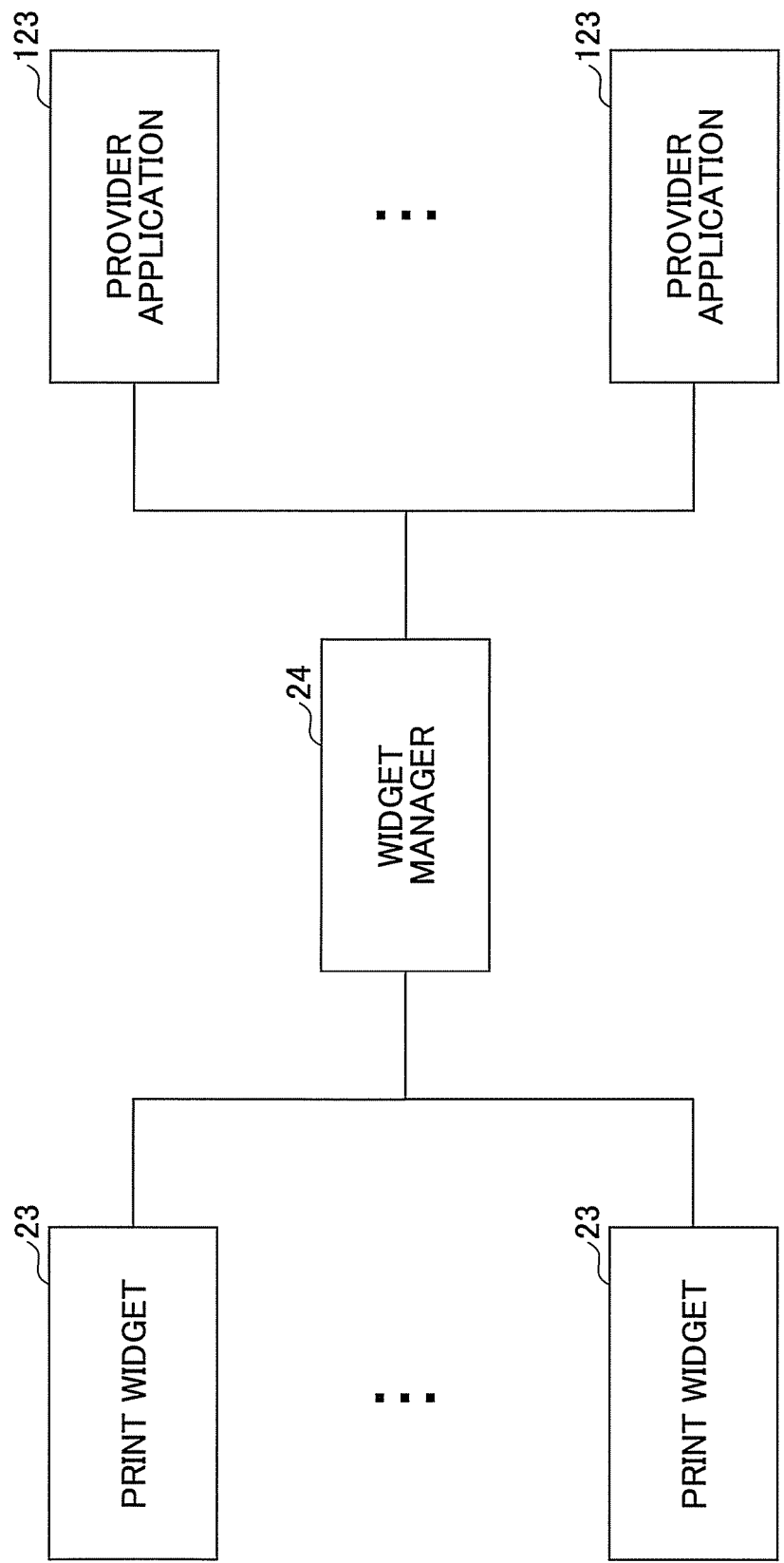
FIG. 4 illustrates an example relationship among a print widget, a widget manager, and a provider application.

FIG. 4 illustrates an example relationship among a print widget, a widget manager, and a provider application. Referring to FIG. 4, print jobs may be registered in the widget manager 24 by plural print widgets 23. The print jobs registered in the widget manager 24 may be acquired by plural provider applications 123. The provider applications 123 correspond to the image forming apparatus 10 one-by-one. The print jobs registered in the widget manager 24 may be acquired by plural image forming apparatuses 10. When a print instruction is input into the user terminal 20, it is not limited which image forming apparatus 10 actually prints. The location of the image forming apparatus that actually prints the print job can be freely determined.

Figure 5:
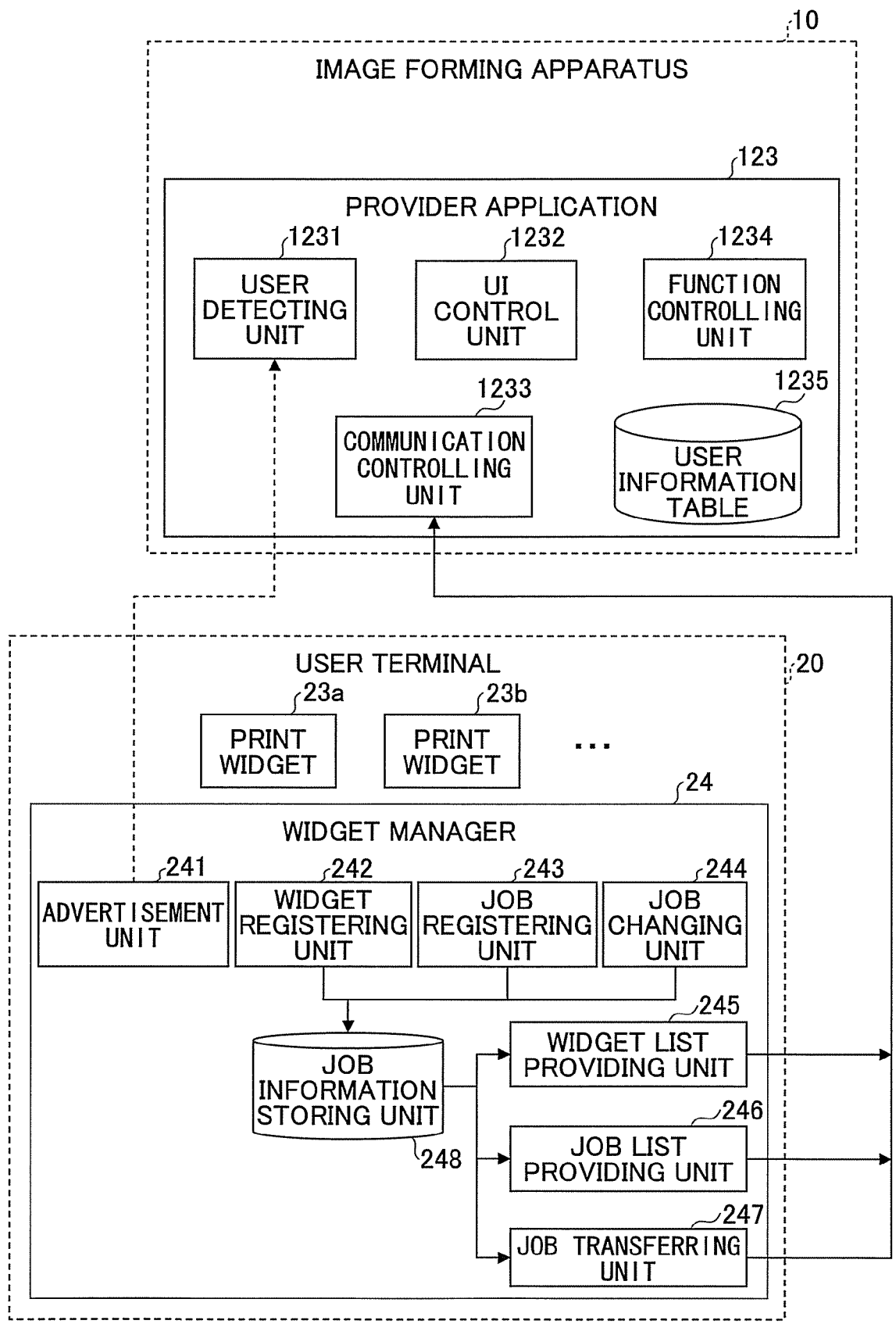
FIG. 5 illustrates example functional structures of the widget manager and the provider application.

FIG. 5 illustrates example functional structures of the widget manager and the provider application.

Referring to FIG. 5, the widget manager 24 includes an advertisement unit 241, a widget registering unit 242, a job registering unit 243, a job changing unit 244, a widget list providing unit 245, a job list providing unit 246, a job transferring unit 247, and a job information storing unit 248.

The advertisement unit 241 issues a broadcast or a multicast for reporting the existence of the widget manager 24 onto the network 40 when the widget manager is activated. The advertisement may be transmitted to unspecified or many destinations by the broadcast, the multicast or the like. Therefore, the broadcast may be received by the provider application 123 of the image forming apparatuses 10 which wait for receipt of the advertisement. With the Embodiment, the widget manager 24 exists one-by-one for each user terminal 20, said differently the widget manager 24 is activated one-by-one for each user terminal 20. The widget manager 24 corresponds to the user one-by-one. Therefore, the report of the existence of the widget manager 24 corresponds to a report of the existence of the user using the print widget 23. The advertisement includes an identifier (user ID) of a user who has logged in the user terminal 20 and activated the widget manager 24 along with an identifier of the widget manager 24. With the Embodiment, the widget manager 24 is handled as a resource on the network and the identifier of the widget manager 24 may be a uniform resource identifier (URI). The URI is referred to as "WIDGET MANAGER URI".

The widget registering unit 242 receives a request for registering a widget information piece transmitted from the activated print widget 23 and registers the widget information piece into the job information storing unit 248. The widget information piece is attribute information of the print widget 23. For example, the widget information piece includes an identifier (widget ID) of the print widget 23, the name of the print widget 23, and so on. The widget manager 24 generates a uniform resource identifier (URI) as an identifier of the registered print widget 23. The URI (hereinafter, referred to as "widget URI") to the print widget 23 as a response to the request for registering the widget information piece.

The job registering unit 243 records or registers the print job into the job information storing unit 248 in response to the request for registering the print job from the print widget 23 registered in the job information storing unit 248. The print job information is information constituting the print job and includes the print setup information and the print data. The print setup information is referred to as a print condition, a print attribute, and a print parameter, which stipulates a print mode. The widget manager 24 generates the URI as the identifier of the registered print job, and returns the URI (hereinafter, referred to as print job URI) to the print widget 23 as a response to the registering request.

The job changing unit 244 changes the print job information corresponding to the print job URI designated in a changing request in response to the changing request to the already registered print job. With the Embodiment, the user may change print setup information, the print data and so on corresponding to the print job held by the widget manager 24 after the print is instructed.

Figure 6:
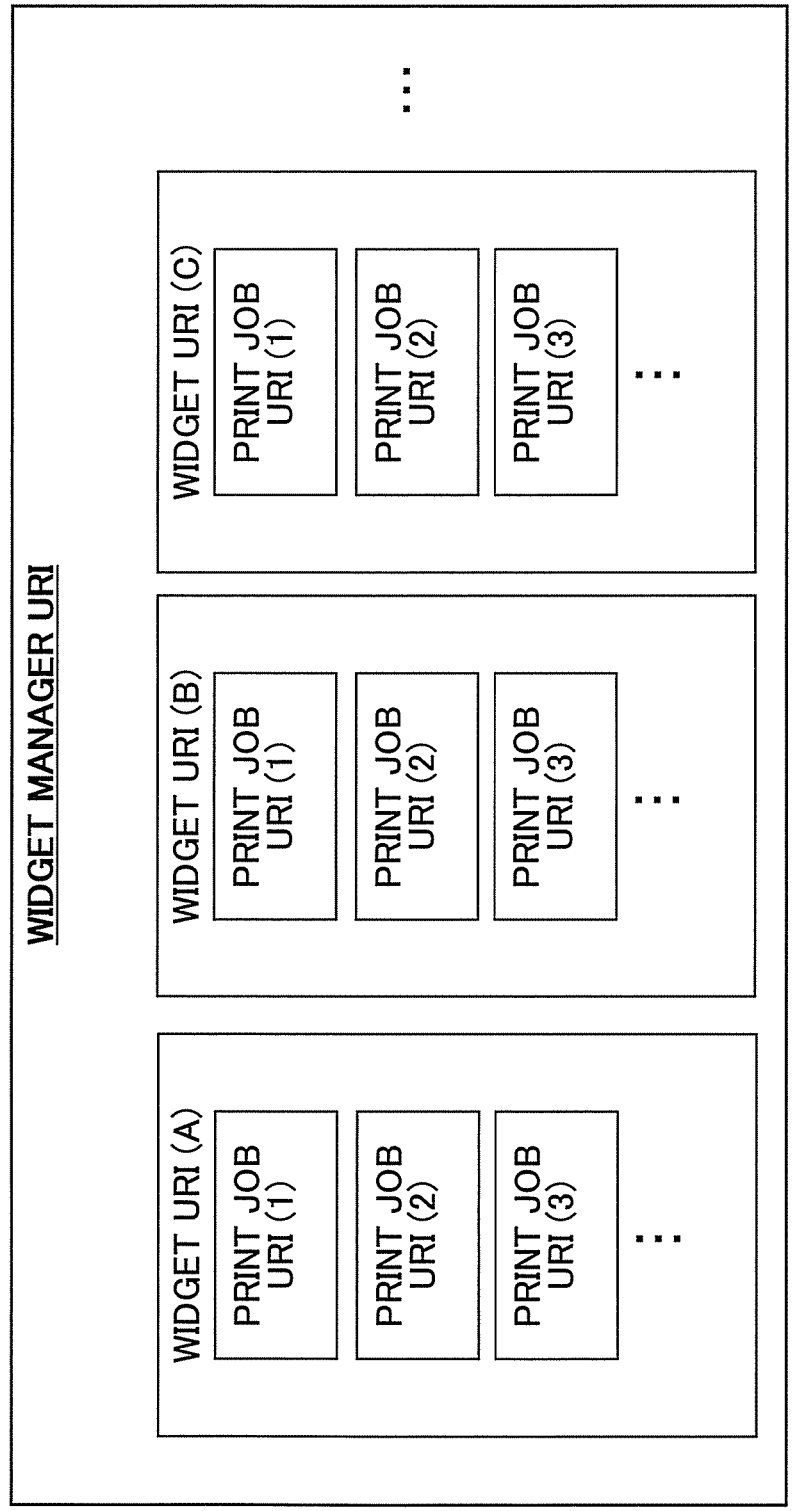
FIG. 6 illustrates a relationship of URIs.

Next, a relationship among the above URIs is described. FIG. 6 illustrates a relationship of widget URIs. Referring to FIG. 6, a relationship among squares illustrates hierarchy of URIs. When one of the squares encloses another of the squares, the enclosing square is in a higher hierarchy than that of the enclosed square. FIG. 6 illustrates the enclosure relationship or the hierarchy relationship among the resources or information identified by the URI.

As illustrated in FIG. 6 one or more print widget(s) is (are) registered in the widget manager identified by one widget manager URL, and the widget URIs are given to corresponding print widgets 23. The widget URI indicates a position of a resource as a management space of information (widget information piece, print job information or the like) related to the print widget 23 corresponding to the widget URI. The widget information piece, the print job information, and so on of the print widget 23 are registered in the management space indicated by the widget URI given to the print widget 23. The one print widget 23 may register plural print job information pieces in the widget manager 24. The print job information registered in the widget manager 24 is managed as a resource on the network and print job URIs are allocated to corresponding print job information pieces.

Referring to FIG. 6, three print widgets 23 are registered into the widget manager 24, and the print widgets 23 registers the three print job information pieces into the widget manager 24. Therefore, the three widget URIs are generated under the widget manager URI, and three print job URIs are generated under each of the three widget URIs.

As described, by managing the resources in association with the URIs, a component which operates the resources such as the print widget 23 or the provider application 123 in the Embodiment via the network may access various resources with a general-purpose WebAPI being an HTTP command.

FIG. 7 illustrates example contents of the widget URIs. FIG. 7 illustrates specific examples of the URIs illustrated in FIG. 6.

A description 401 is an example of the widget manager URI. With the Embodiment, the path name of the widget manager URI is "widgets". In FIG. 7, <ADDRESS> designates an IP address of the user terminal 20, and <PORT NUMBER> designates a port number of the widget manager 24.

Descriptions 410, 420, and 430 are specific examples of the widget URI of the different print widgets 23. The path name of the widget URI is "widgets/<WIDGET ID>". Said differently, the path name is formed by adding the widget ID of the print widget 23 to the path name of the widget manager URI.

The descriptions 411 to 413 correspond to three print job information pieces registered by the print widget 23 corresponding to the widget URI related to the description 410. The path name of the print job URI is "widgets/<WIDGET ID>/jobs/<JOB ID>". Said differently, the path name of the print job URI is formed by adding the job ID of the print job to the path name of the widget URI. The job ID is allocated or selected by the widget manager 24 when the print job information is registered into the widget manager 24. In a manner similar to this, the descriptions 421 to 423 correspond to three print job information pieces registered by the print widget 23 corresponding to the widget URI related to the description 420. The descriptions 431 to 433 correspond to three print job information pieces registered by the print widget 23 corresponding to the widget URI related to the description 430.

Referring back to FIG. 5, the widget list providing unit 245 returns list information of the print widget 23 registered in the job information storing unit 248 in response to a request for acquiring the list information of the print widget 23 from the provider application 123. The list returned information includes the widget URIs for each print widget 23.

The job list providing unit 246 returns the list information of the print jobs registered by the print widget 23 related to the widget URI, which is designated by a request for acquiring the list information of the print jobs from the provider application 123 in response to the acquiring request. The list information to be returned includes print job URIs for each print job.

The job transferring unit 247 returns the print job information of the print job related to the print job URI designated by the acquiring request in response to the acquiring request of the print job from the provider application 123. The provider application 123 which has received the print job causes the image forming apparatus 10 to carryout the print job based on the print job information.

Meanwhile, the provider application 123 includes a user detecting unit 1231, a UI control unit 1232, a communication controlling unit 1233, a function controlling unit 1234, a user information table 1235, and so on.

The user detecting unit 1231 detects the existence of the user who can use the print widget 23 based on the receipt of the advertisement issued by the widget manager 24 and registers the user ID and so on included in the advertisement into the user information table 1235. The UI control unit 1232 carries out a display control of various screens for inputting operation instructions related to the provider application 123. The communication controlling unit 1233 transmits a request for acquiring the widget list information, a request for acquiring the list information of the print job, a request for acquiring the print job, or the like to the widget manager 24, and receives a response for the request. The function controlling unit 1234 carries out a control of a function (printing) requested to the image forming apparatus 10 with the print widget 23 which is subject to being used. The user information table 1235 having widget manager URIs of the widget manager 24 activated in the user terminals 20, the user IDs of the user terminals 20, and so on is recorded in a memory device such as HDD 114 of the image forming apparatus 10.

In the Embodiment, communications between the print widget 23 and the widget manager 24 and between the widget manager 24 and the provider application 123 are carried out by hypertext transfer protocol (HTTP). However, other communication protocol may be used.

Hereinafter, the procedure of the information processing system 1 is described. FIG. 8 is a sequence diagram illustrating procedures in activating the widget manager and the print widget.

When the widget manager 24 is activated upon a user's instruction or automatically activated, the advertisement unit 241 of the widget manager 24 transmits the advertisement of the user information including the user ID of the login user and the widget manager URI into the network 40 is step S101.

Thereafter, when the communication controlling unit 1233 of the provider application 123 receives the advertisement, the communication controlling unit 1233 registers the user information included in the advertisement into the user information table 1235 in step S102.

FIG. 9 illustrates a structural example of the user information table. Referring to FIG. 9, one record of the user information table 1235 corresponds to one user information item. Every record is formed by items such as a user ID and a widget manager URI. Values received in step S102 are directly recorded in the items.

Thereafter, the print widget 23a is activated in the user terminal 20. The print widget 23a reads the widget information piece from the own setup file and transmits a request for registering the widget information piece to the widget manager URI in step S103. The widget manager URI is recorded in a memory region such as a setup file of the print widget 23a to which the print widget 23a can access.

FIG. 10 illustrates an example request for registering the widget information piece. Referring to FIG. 10, the POST command of a description d11 of a registering request Rq1 indicate a registering request. A description d12 indicates a widget manager URI being the destination. In the Embodiment, since the print widget 23a and the widget manager 24 are located in the same user terminal 20, the IP address is omitted in the description d12. A description d13 corresponds to the widget information piece. Referring to FIG. 10, only a part of the widget information piece is illustrated for convenience. Contents of the widget information piece may be as illustrated in FIG. 11.

FIG. 11 illustrates a structural example of the widget information piece of the print widget. FIG. 11 illustrates the contents of the description d13 in a form of table. In the Embodiment, the widget information piece of the print widget 23 includes a widget ID, a widget name, a cooperating function identifier, an indicating name, and so on.

The widget ID is identifying information for uniquely identifying the print widgets 23. The widget name is a name of the widget. The cooperating function identifier is information for identifying a function which is used by the print widget 23a and performed by the image forming apparatus 10 cooperating with the print widget 23a. One example of the cooperating function identifier is "printing", "scanning" or the like. The print function is indicated by "print", and the scan function is indicated by "scan". The print widget 23a uses the print function of the image forming apparatus 10. Therefore, "print" is a cooperating function identifier in the example illustrated in FIG. 11. The indicating name is a character string for displaying the print widget 23a.

The widget registering unit 242 of the widget manager 24 registers the widget information piece into the job information storing unit 248 in response to a request for registering the widget information piece in step S5104. Then, the widget registering unit 242 generates the URI corresponding to the recorded widget information piece in step S105. The URI is the widget URI. The widget URI may be generated and named as "WIDGET MANAGER URI/<WIDGET ID>". The widget information pieces and the widget URI are mutually associated and managed by the widget manager 24. Thereafter, the widget registering unit 242 returns a response including the generated widget URI to the print widget 23a in step S106.

FIG. 12 illustrates an example response to a request for registering the widget information pieces. The description d21 in the response Rs1 is the widget URI. The print widget 23a stores the received widget URI using the memory device 203.

Thereafter, the print widget 23a causes the print setup screen to display in response to the instruction by the user and receives an input of the print setup information via the print setup screen in step S107. The instruction by the user may be a selection of items of a context menu which is ordinarily displayed by clicking a right button of a mouse on an icon displayed by the print widget 23a in response to the activation. Thereafter, the print widget 23a stores the input print setup information into its own setup file in step S108.

The process on and after step S107 may not be carried out if the print setup information already set up in the print widget 23a or stored in the setup file of the print widget 23a is not changed.

After the above processes are completed, the print job may be registered in the widget manager 24.

Figure 13:
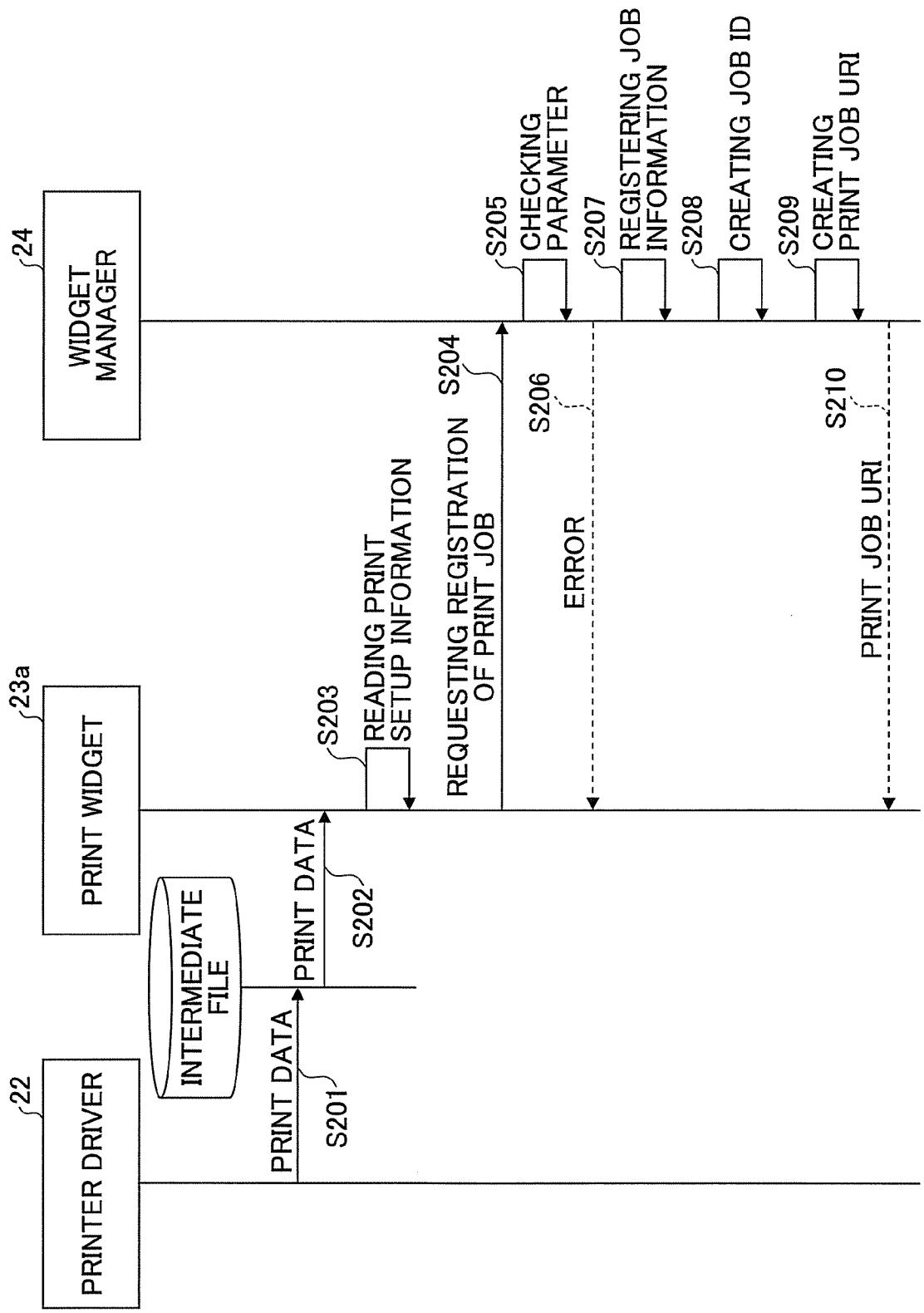
FIG. 13 is a sequence diagram illustrating procedures in registering a print job into the widget manager.

FIG. 13 is a sequence diagram illustrating procedures in registering the print job into the widget manager.

When print instruction is input into the user terminal 20 by the user who operates the document application 21, the printer driver 22 generates print data related to the document data generated by the document application 21. When a logic printer corresponding to the print widget 23a is designated a destination of print, the printer driver 22 generates an intermediate file having a predetermined file name which is set up as an output destination to the logic printer in step S201.

Meanwhile, the print widget 23 a waits for the generation of the intermediate file having the predetermined file name after the print widget 23a is activated. Specifically, the print widget carries out polling to check whether the intermediate file exists. When the print widget 23a detects the generation of the intermediate file, the print widget 23a reads print data from the intermediate file in step S202. In the user terminal in which plural print widgets are activated, the logic printers may be set up for each of the print widgets 23, and the file names of the intermediate files output by the logic printers may be differentiated. The print widgets 23 wait for the generation of the intermediate files which are output by the logic printers corresponding to the print widgets. Thus, a competition among the plural print widgets 23 relative to the same intermediate file is avoidable. The reason why the plural print widgets 23 are activated is that the print setup information pieces set up in the print widgets 23 are differentiated and the print widgets 23 to be used in response to a desired print mode are switched over. By selecting the logic printer corresponding to the print widgets 23, it is possible to select the print widget 23 to be used.

Thereafter, the print widget 23a reads the print setup information from its own setup file in step S203. Then, the print widget 23a transmits a request for registering the print job including the print setup information and print data into the "WIDGET URI/jobs" in step S204. The destination of requesting to register the print job is formed by adding "/jobs" to the path name of the widget URI. This naming rule may be commonly recognized between the widget manager 24 and the print widgets 23.

Figure 14:
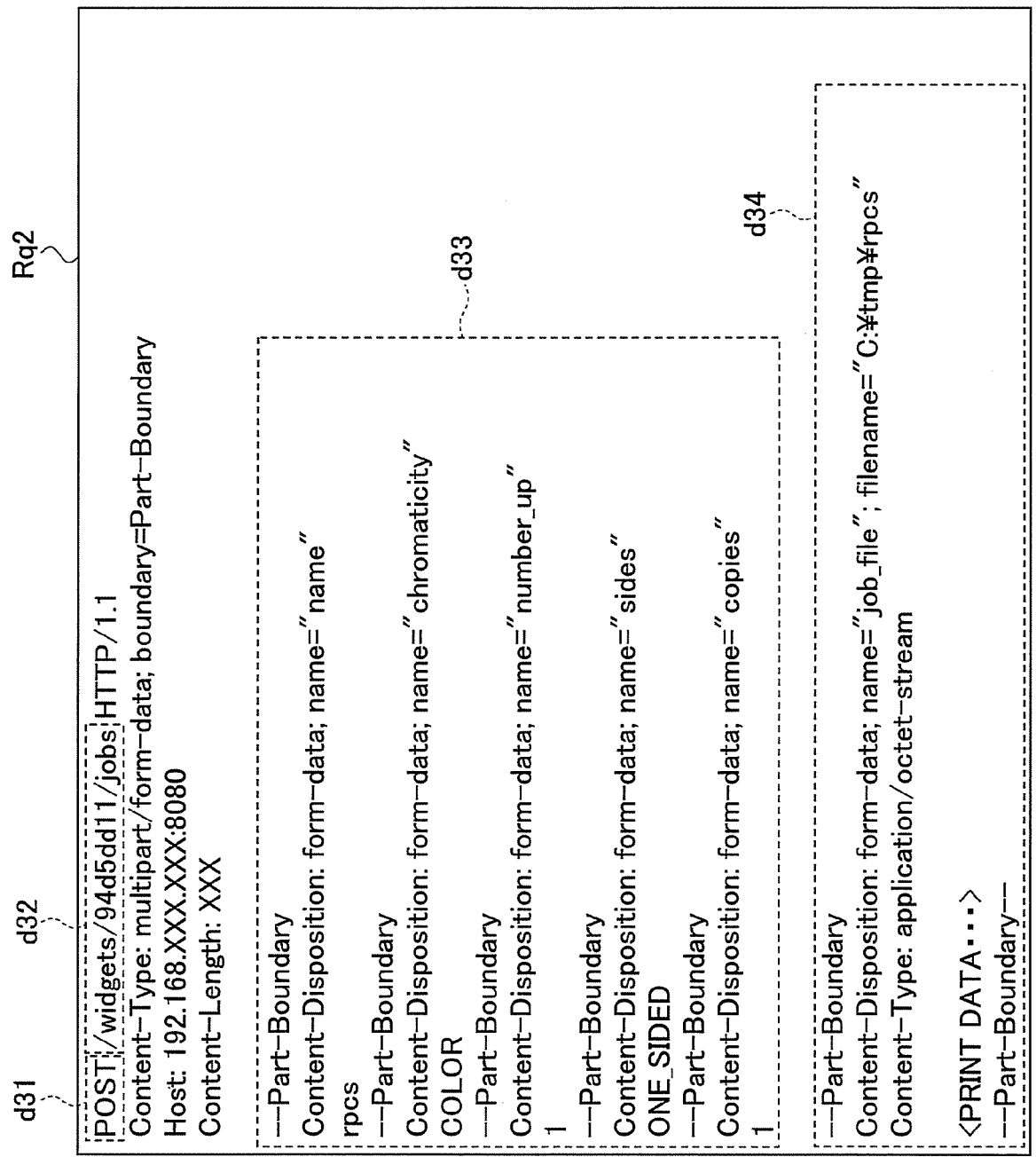
FIG. 14 illustrates an example request for registering the print job information.

FIG. 14 illustrates an example request for registering the print job information. Referring to FIG. 14, the POST command of a description d31 of a registering request Rq2 indicate a request for registration. A description d32 indicates a URI of a destination. Here, a path name of an echelon one echelon higher than that of the print job URI given to the print job related to the registering request is designated. A description d33 indicates print setup information. Referring to FIG. 14, parameters of setup items forming the print setup information may be a color setup (chromaticity), an aggregation setup (number_up), a print side setup (sides), or a setup of the number of copies (copies). A description d34 indicates attribute information related to the print data and an entity of the print data.

The job registering unit 243 of the widget manager 24 checks the parameters (setup items) included in the received print job information based on the parameter check information (predetermined standard) in response to the request for registering the print job in step S205. For example, it is checked whether the setup content of the parameters (combinations and values of the parameters) is logically contradictory. When there is no logical contradiction, it is checked whether a setup, which is not performed by an ordinary image forming apparatus 10 or an image forming apparatus connected to the network 40, is provided. The parameter check information may be assembled as a logic of the widget manager 24 or recorded as an external file in the memory device auxiliary storage device 202.

When there is a problem in the parameters, the parameters do not satisfy a predetermined standard, the parameters have a logical contradiction, or the parameters are not suitable for any of the image forming apparatuses 10, the job registering unit 243 does not carry out the registration of the job information and returns the error report in step S206. Said differently, the parameters are not modified.

When there is no problem in the parameters or the parameters satisfy a predetermined standard, the job registering unit 243 records the received print job information into the job information storing unit 248 in step S207. Thereafter, the job registering unit 243 generates the job ID corresponding to the print job related to the registered print job in step S208. Thereafter, the job registering unit 243 adds a job ID to the URI designated as the destination of requesting to register the job information to thereby generate the print job URI in step S209. The print job information and the print job URI are associated each other and managed by the widget manager 24.

The widget manager 24 manages the print job information and the print data by clearly distinguishing these print job information and print data in a separated form. Specifically, an independent URI is given to the print data. Therefore, the print data are handled as a single and independent resource. The print data URI is formed by adding a predetermined symbol "/file/" to the path name of the print job URI. This naming rule is recognized by the print widget 23 and the widget manager 24 in common. Adding the print data URI to the print data means that the print widget 23 is independent from the print setup information and can directly access the print data.

Figure 15:
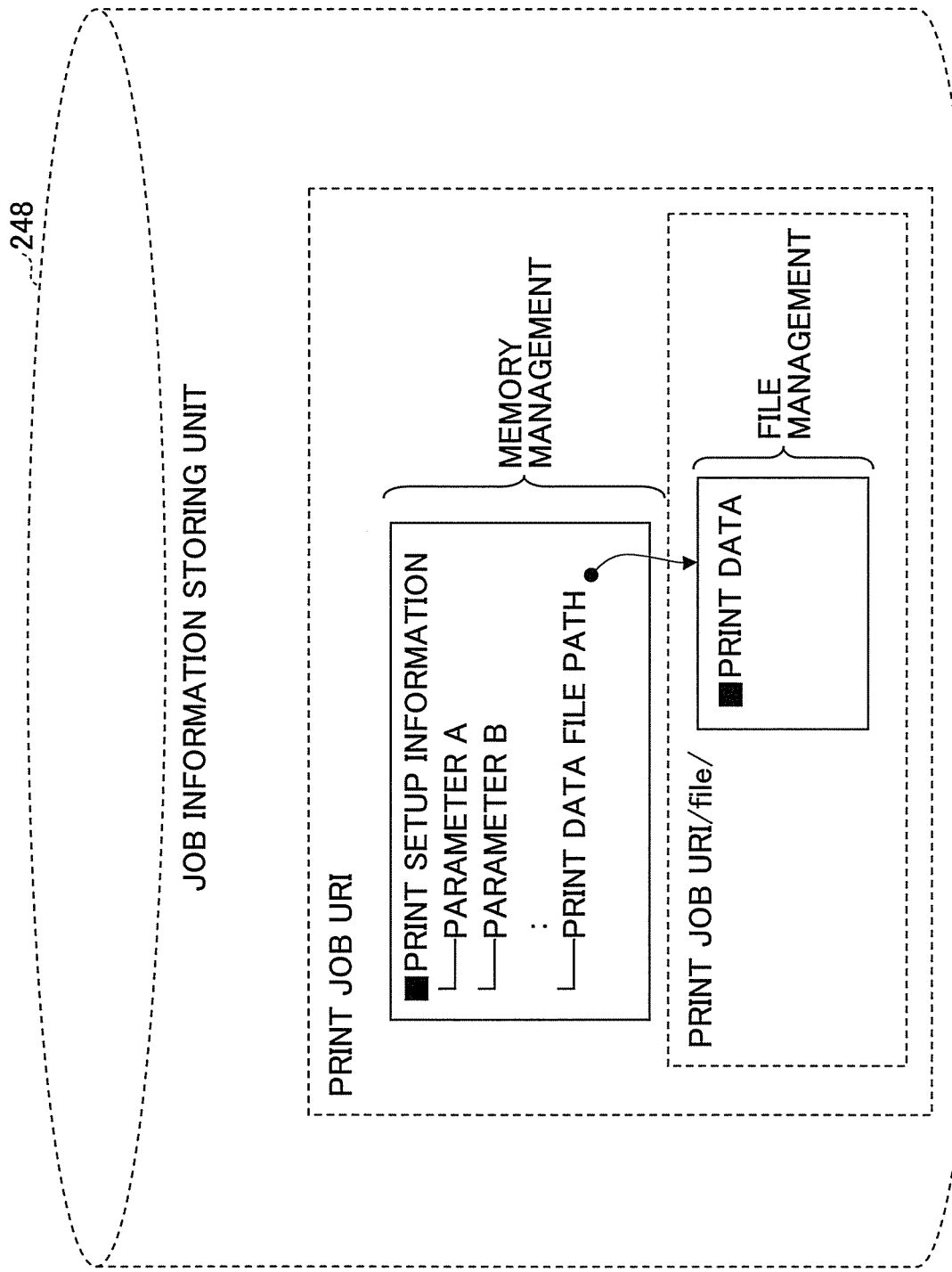
FIG. 15 illustrates a print setup information used by the widget manager and an example management mode of the print data.

The widget manager 24 discriminates among memory positions of the print setup information and the print data. FIG. 15 illustrates print setup information used by the widget manager and an example management mode of the print data.

Referring to FIG. 15, the print setup information is managed as data such as a structure or object recorded in a memory such as the memory device 203, and the print data are managed as a file (hereinafter, referred to as "print data") recorded in the memory device auxiliary storage device 202. In the memory, data managing the print setup information include reference information such as a pointer. As illustrated in FIG. 15, it is possible to access the print setup information by using the print job URI. The print information is recorded in the memory because the performance in accessing the memory is higher than the other medium. Therefore, when there is room in the storage capacity of the memory, the print data may be recorded in the memory. On the contrary, when there is no room in the storage capacity of the memory, the print setup information may be recorded in the memory device auxiliary storage device 202 as a file.

Thereafter, the widget registering unit 243 returns a response including the generated print job URI to the print widget 23a in step S210.

FIG. 16 illustrates an example response to the request for registering the print job information. A description d41 in a response Rs2 is the print job URI. Referring to the FIG. 16, "67ae2c2" is allocated as the job ID. The print widget 23a stores the received print job URI using the memory device 203.

The processes of FIG. 13 are carried out for every input of print instructions. When the logic printer corresponding to the logic printer is selected, the processes illustrated in FIG. 13 are carried out for the print widget 23b. As a result, as illustrated in FIG. 6, plural print job information pieces for plural print widgets 23 may be registered or accumulated in the widget manager 24.

When document files to be printed or files storing the document data are directly dragged and dropped onto an icon displayed by the print widget 23a, the print job information is registered into the widget manager 24. Specifically, the print widget 23a activates the document application 21 corresponding to the document file with a command line in which the file name of the dragged and dropped document file is designated as an argument, and a print process in which the logic printer corresponding to the print widget 23a prints is carried out by the document application 21. As a result, in a manner similar to step S201 of FIG. 13, the print data of the document data are generated by the printer driver 22, and the print data are output to an intermediate file having a predetermined name and set up as the output destination of the logic printer. Thereafter, steps S202 to S210 are carried out. The document application 21 activated by the command line automatically ends. The document application 21 corresponding to the document file may be determined based on a table indicating a relationship between an extension of the document file and the document application 21. The table may be maintained by the print widget 23a or stored in the memory device used by the user terminals in common. When the document file dragged and dropped has a file form which can be directly printed, the processes on and after step S203 may be carried out without activating the document application 21 with the command line.

After registering the print job, the user moves to a location of the image forming apparatus 10 to carry out the registered print job. When plural image forming apparatuses 10 are connected to the network 40, the same advertisement is received by the image forming apparatuses 10, and the user ID and the widget manager URI are registered in the user information tables 1235 of the image forming apparatuses 10. Therefore, the user can carry out the print jobs in any of the plural image forming apparatuses 10.

Figure 17:
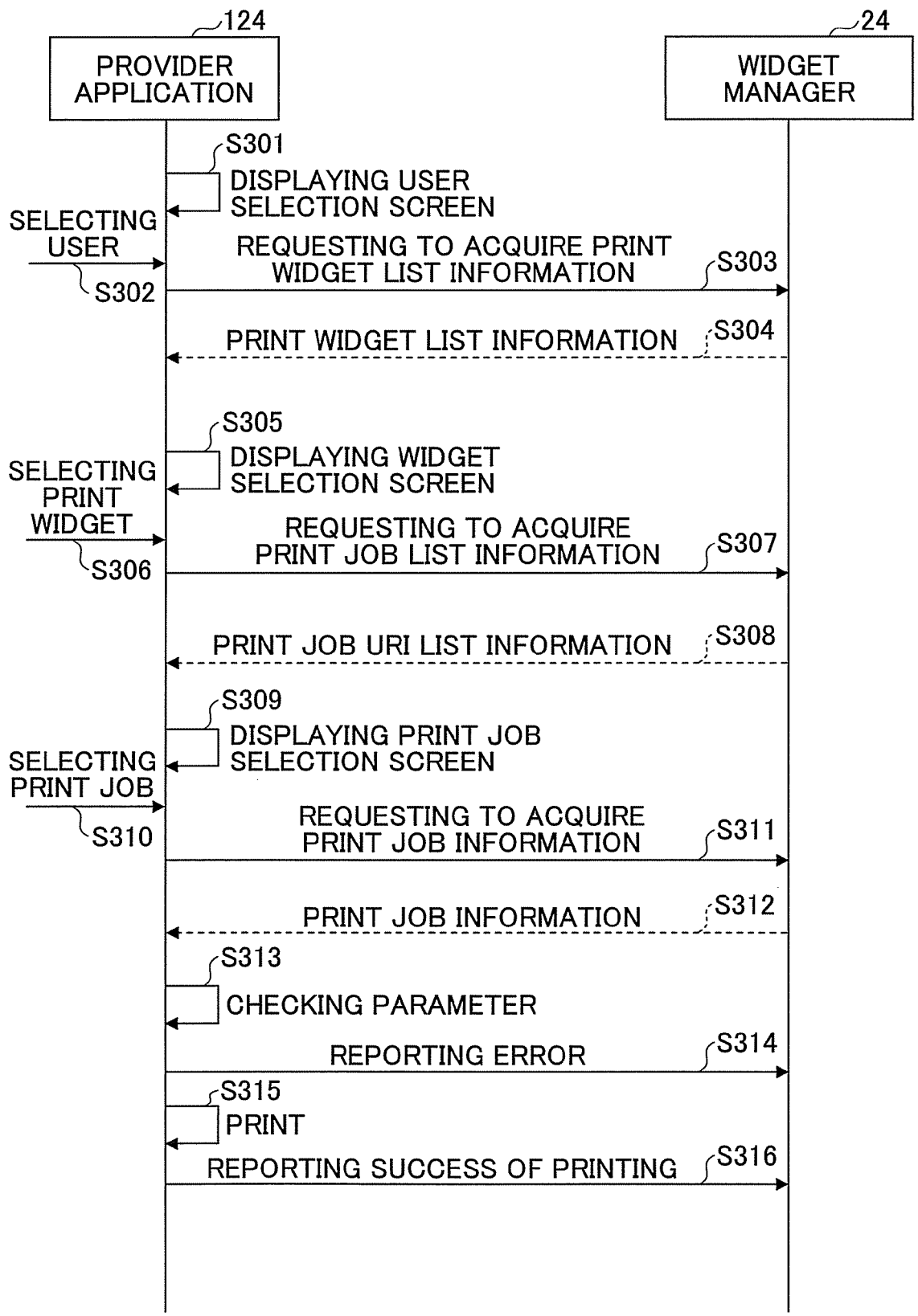
FIG. 17 is an example sequence diagram illustrating procedures in carrying out the print job.

FIG. 17 is an example sequence diagram illustrating procedures in carrying out the print job.

When an instruction of using the provider application 123 via the operations panel 15 is input by a user, the application control unit 130 activates the provider application 123 to be the active application. The UI control unit 1232 of the provider application 123 detects that the provider application 123 is the active application 120. Then, the UI control unit 1232 displays a user selection screen on the operation panels 15 based on the information registered in the user information table 1235 in step S301. The user selection screen displays display components such as a button enabling to select each user ID registered in the user information table 1235.

Thereafter, the user selects a button corresponding to the user ID on the user selection screen in step S302. The communication controlling unit 1233 acquires the widget manager URI associated with the user ID corresponding to the selected button from the user information table 1235. Thereafter, the communication controlling unit 1233 transmits a request for acquiring a list information of the print widget 23 to the widget manager URI in step S303. The acquiring request of the list information of the print widget is received by the widget list providing unit 245 of the widget manager 24 corresponding to the widget manager URI. The widget list providing unit 245 returns all the widget information pieces recorded in the job information storing unit 248 of the widget manager 24 and the list of the widget URI associated with the widget information pieces to the provider application 123 as the list information of the print widget 23 in step S304.

Thereafter, the UI control unit 1232 of the provider application 123 records the received list information of the print widget 23 in the RAM 112, and displays a widget selection screen including the list of the print widgets usable by the user on the operations panel 15 in step S305. Display components such as a button are displayed for each print widget 23 on the widget selection screen. For example, indicating names of the print widgets 23 are displayed on the display components.

When a button corresponding to any of the print widgets 23 is selected on the widget selection screen in step S306, the communication controlling unit 1233 recognizes that the print is carried out based on the cooperating function identifier "print" included in the widget information piece (hereinafter, referred to as "current widget information piece" corresponding to the selected button). It is necessary to acquire the print job information in order to print. Therefore, the communication controlling unit 1233 transmits a request for acquiring the list information of the print job to the widget URI associated with the current widget information piece in step S307.

The request for acquiring the list information of the print job to the widget URI may be received by the job list providing unit 246 of the widget manager 24 related to the widget URI. The job list providing unit 246 returns the list of the print job URI having the path name on and after "<the WIDGET URL>/jobs" to the provider application 123 in step S308.

Thereafter, the UI control unit 1232 of the provider application 123 records the list of the received print job URI in the RAM 112, and displays a print job selection screen displaying a list of the registered print jobs on the operations panel 15 based on the list in step S309. Display components such as a button are displayed for each print job on the print job selection screen.

When the button corresponding to any of the print job URI is selected on the widget selection screen in step S310, the communication controlling unit 1233 transmits the request for acquiring the print job information to the print job URI corresponding to the selected button in step S311.

The request for acquiring the print job to the print job URI is received by the job transferring unit 247 of the widget manager 24 related to the print job URI. The job transferring unit 247 acquires print setup information associated with the print job URI and print data associated with the print data URI of "<the PRINT JOB URI/file/>" from the job information storing unit 248, and returns the print job information including the print setup information and the print data to the provider application 123 in step S312.

The communication controlling unit 1233 of the provider application 123 inputs the received print job information to the function controlling unit 1234. The function controlling unit 1234 checks whether a parameter included in the input print setup information can be dealt with by the image forming apparatus 10 or whether the function about the parameter is performed by the image forming apparatus 10 based on parameter check information (predetermined standard) in step S313. The content of the parameter check information in step S313 is different from the content of the parameter check information used in checking the parameter carried out by the widget manager 24 in step S205 of FIG. 13. Said differently, when the print job is registered in the widget manager 24, the image forming apparatus 10 which actually prints is not determined. Therefore, the widget manager 24 checks the parameter with a general measure. On the other hand, the image forming apparatus 10 to print is determined in step S313. Therefore, it is a major check point whether the image forming apparatus 10 can deal with the parameter. The parameter check information used by the function controlling unit 1234 may be assembled in the function controlling unit 1234 as a login or as a external file stored in the HDD 114.

When there is a problem in the parameter or the parameter does not satisfy the predetermined standard, the communication controlling unit 1233 transmits an error report indicating that the print job is failed to the widget manager in step S314. However, the print job can be carried out. In this case, the function controlling unit 1234 ignores the parameter which cannot be dealt with the image forming apparatus 10 or changes the value of the parameter by downgrading the print setup information.

When there is no problem in the parameter or the parameter satisfies the predetermined standard, the function controlling unit 1234 causes the image forming apparatus 10 to carry out the print job based on the print setup information and the print data in step S315. However, there is a case where the print setup information set up by the printer driver 22 is included in the print data. For example, the printer driver 22 ordinarily has a print setup dialog independent from the print widget 23 and outputs the print data including the print setup information set up for the logic printer via the print setup dialog. In this case, there is a probability that the print setup information included in the print data competes with the print setup information (print setup information included in the print job information besides the print data) set up for the print widget 23. Specifically, there is a probability that different values are set up in the print setup information pieces for the same parameter such as the paper size. In this case, the function controlling unit 1234 gives a priority to the print setup information which is set up for the print data. Meanwhile, as to the parameter specified by the print setup information included in the print data (a default parameter depending on a default operation of the image forming apparatus 10), the print setup information set up for the print widget 23 is effective. The priority of the print setup information is (1) contained in the print data, (2) set up for the print widget 23, and (3) set up as the default operation of the image forming apparatus 10 in this order. It is preferable to previously match the print setup information for the print widget with the print setup information for the logic printer corresponding to the print widget 23.

After the print job normally finishes, the communication controlling unit 1233 transmits a success report indicating that the print job has been successfully carried out to the widget manager 24 in step S316.

Even though the print job is successfully carried out by the widget manager 24, the widget manager related to the print job does not automatically delete the print job information from the job information storing unit 248. Therefore, the user can cause the image forming apparatus 10 or another image forming apparatus 10 to again carry out the same print job. Especially, when the print setup information is downgraded and the print job is carried out, the print result may exceed a user's acceptable range. In this case, the user may carry out the same print job again in the other image forming apparatus 10 without repeatedly instructing to print in the user terminal 20. An object to be downgraded is limited to the print job information acquired by the image forming apparatus 10, and the print job information managed by the widget manager 24 is not revised.

However, it is possible to automatically delete the print job information only on a predetermined occasion. For example, the print widget 23 may register information (hereinafter, referred to as "automatic deletion flag") indicating whether the print job information is automatically deleted in the widget manager 24. The widget manager 24 deletes the print job information (the print setup information and the print data) from the job information storing unit 248 when the automatic deletion flag related to the print job is in the on-state at a time of receiving the success report of the print job from the provider application, and does not delete the print job information when the automatic deletion flag in the off-state.

The value of the automatic deletion flag may be changed not only to the on or off-state but also to "deletion after carrying out N times" or "deletion after a passage of N days".

The print widget 23 may determine the value of the deletion flag based on the content of the own setup file. It is sufficient to register the value of the deletion flag into the setup file.

Figure 18:
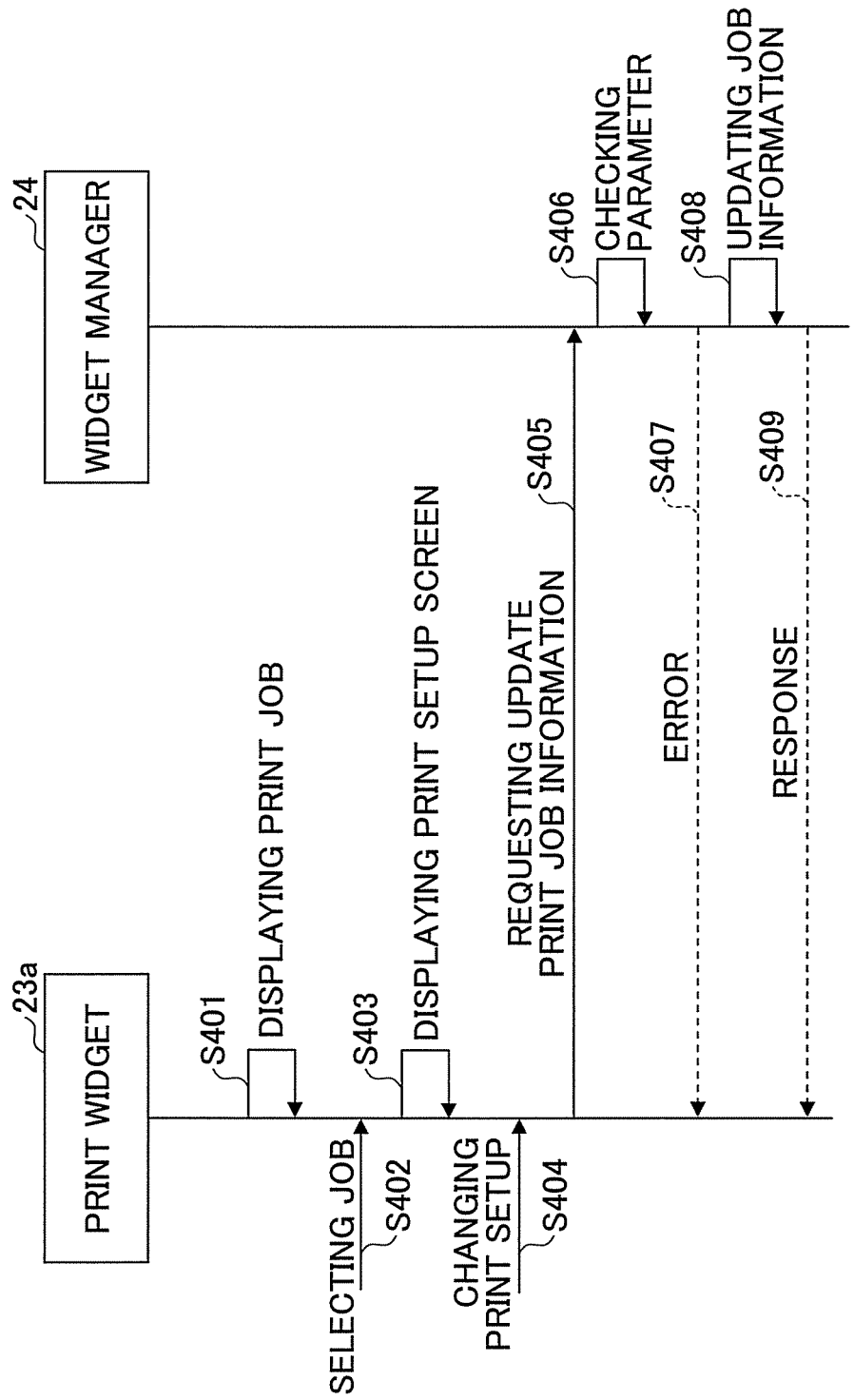
FIG. 18 is an example sequence diagram illustrating procedures in changing the print job information.

Next, a change of the print job information managed by the widget manager 24 is described. FIG. 18 is an example sequence diagram illustrating procedures in changing the print job information.

By placing a pointer on the icon of the print widget 23a and clicking a right button of a mouse, a context menu is displayed. When a user inputs an instruction of changing the print job information, the print widget 23a causes a list screen of the print jobs to display on a screen based on the list of the print job URIs stored by the print widget 23a in step S401. On the list screen, when the print jobs to be changed by the user is selected in step S402, the print widget 23a causes the print setup screen to display in step S403. On the print setup screen, it is possible to input values of various parameters forming the print setup information. The user inputs the values of a parameter to be changed with the print setup screen in step S404. When the print data are changed or substituted, a file storing the print data to be substituted is selected.

When the change is input, the print widget 23a transmits a request for changing the print job information to the widget manager 24 in step S405. When the print setup information is changed, the request for changing the print job information may become as illustrated in FIG. 19.

FIG. 19 illustrates an example request for changing the print job information when the print setup information is changed. Referring to FIG. 19, a PUT command of a description d51 of a changing request Rq3 indicates a request for changing the print job information. The description d52 designates a print job URI. When the print setup information is changed, the destination of the request for changing the print job information is the print job URI. The description d52 designates a parameter to be changed.

FIG. 20 illustrates an example request for changing the print job information when print data is changed. Referring to FIG. 20, a PUT command of a description d61 of a changing request Rq3 indicates a request for changing the print job information. A description d62 indicates a print data URI. When the print data are changed, the changing request is transmitted to the print data URI. A description d63 indicates new print data.

The job changing unit 244 of the widget manager 24 checks the received parameter (setup items) in response to the request for changing the print information when the print setup information is changed in step S406. The contents to be checked may be the same as that in step S205 of FIG. 13 at the time of registering the print job. When there is a problem in the parameter, the job changing unit 244 does not change the job information and returns an error report in step S407.

When there is no problem in the parameter, the job changing unit 244 updates the print setup information corresponding to the print job URI which is designated in the changing request using the received parameter in step S408. When the print data are changed, the job changing unit 244 updates the print data corresponding to the print data designated in response to the changing request with the print data in step S408. Thereafter, the job changing unit 244 returns a response indicating that the print job information is successfully changed to the print widget 23a in step S409.

Figure 21:
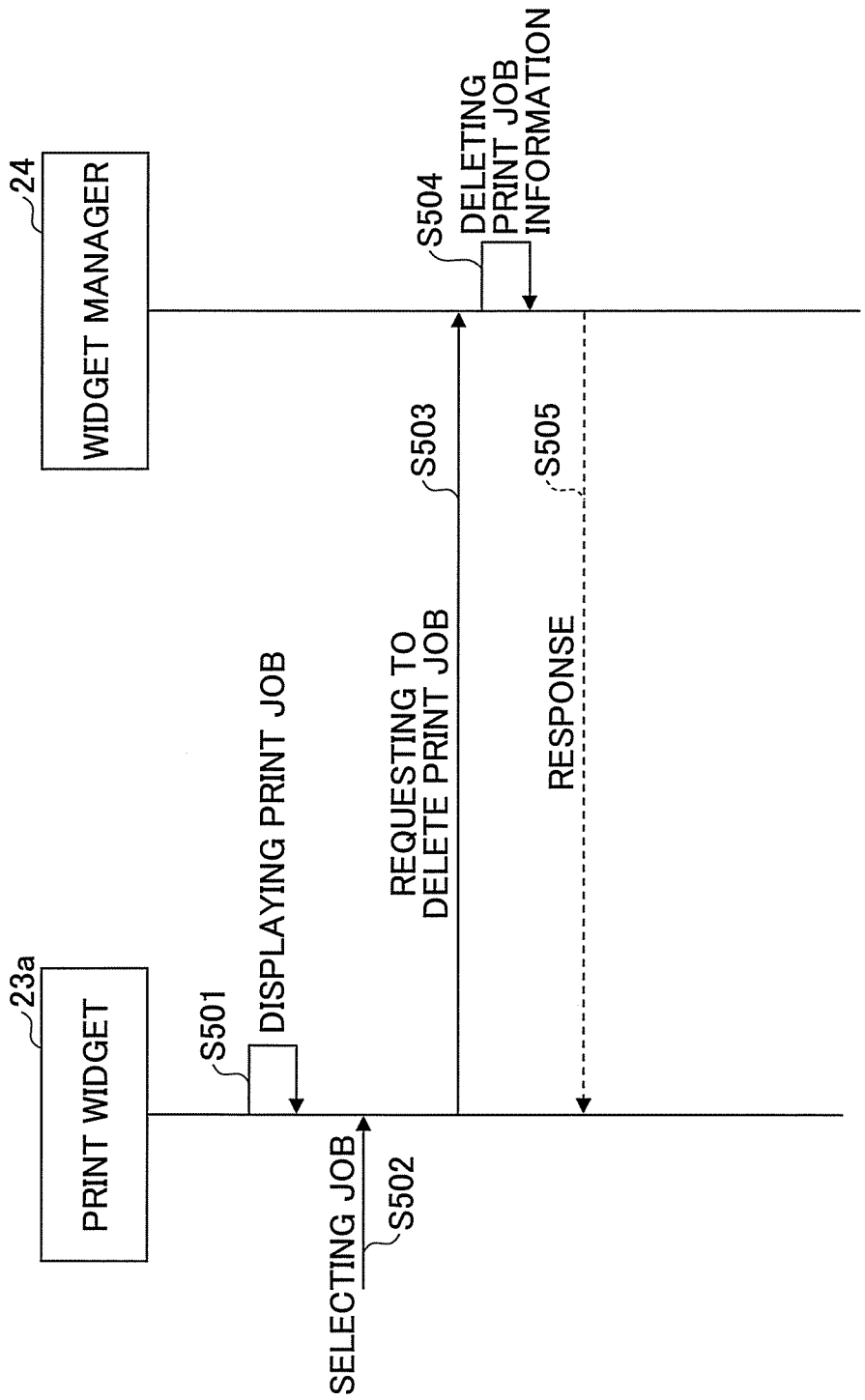
FIG. 21 is an example sequence diagram illustrating procedures in deleting the print job information.

Next, a deletion of the print job information managed by the widget manager 24 is described. FIG. 21 is an example sequence diagram illustrating procedures in changing the print job information.

By placing a pointer on the icon of the print widget 23a and clicking the right button of the mouse, the context menu is displayed. When the user inputs an instruction of deleting the print job information, the print widget 23a causes a list screen of the print jobs to display on the screen based on the list of the print job URIs stored by the print widget 23a in step S501.

When the print job to be deleted is selected on the list screen by the user in step S502, the print widget 23a transmits a request for deleting the print job information to the print job URI of the print job to be deleted in step S503.

FIG. 22 illustrates an example request for deleting the print job information. In a deleting request Rq5 of FIG. 22, a DELETE command in a description d71 indicates the request for deleting the print job information. A description d72 indicates a print job URI.

The job changing unit 244 of the widget manager 24 deletes the print job information corresponding to the print job URI designated in the request for deleting from the job information storing unit 248 in response to the request for deleting the print job information in step S504. Therefore, the print setup information is deleted from the memory device 203, and the print data file is deleted from the memory device auxiliary storage device 202. Thereafter, the job changing unit 244 returns a response indicating that the print job information is successfully deleted to the print widget 23a in step S505.

The change or deletion of the print job information can be carried out before and after the image forming apparatus 10 outputs a copy or the like for the print job information. Therefore, the user may change his or her mind to change the print job information before the output is obtained, or the user may reuse the print job first output and second output a copy or the like after changing a part of the print setup information of the print job first output.

As described, with the Embodiment, after the print job information is registered or accumulated into the widget manager 24, the content can be changed. Therefore, operability of the accumulated print jobs may be improved. Especially, in the Embodiment, identifiers are separately allocated to the print setup information and the print data and managed. Therefore, the print setup information and the print data may be separately operated. It is possible to operate a part of the print job information. Further, since the URI is used as the identifiers of the print setup information, the print data or the like, it is possible to access the URI as the resource on the network. Therefore, it is possible to operate the print setup information and the print data using typical WebAPI.

A protocol such as HTTP for network communications is used between the print widget 23 and the widget manager 24. Therefore, the widget manager 24 is not always located inside an apparatus in which the print widget 23 is installed. Print jobs generated by the print widgets 23 of the plural user terminals 20 may be managed by a widget manager 24.

According to the Embodiment, operability of the accumulated print jobs may be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2009-289537 filed on Dec. 21, 2009, the entire contents of which are hereby incorporated herein by reference.

What is claimed is:

1. A print job management apparatus comprising:
a job registering unit configured, in response to a request of a print requesting unit for registering print jobs including print setup information and print data, to associate the print setup information with first identifiers, associate the print data with second identifiers formed by adding predetermined symbols to the first identifiers, record the print setup information and the print data in a job information storing unit, and return the first identifiers to the print requesting unit;
a job list providing unit configured, in response to a request of an image forming apparatus connected to the print job management apparatus via a network for acquiring a list of the print jobs, to return a list of the first identifiers;
a job transferring unit configured, in response to a request for acquiring the print job corresponding to one of the first identifiers selected from the list by the image forming apparatus, to return the print setup information associated with the requested one of the first identifiers and the print data associated with the second identifiers corresponding to the requested one of the first identifiers; and
a job changing unit configured, in response to a request for changing at least a part of the print setup information associated with the first identifier which is received from the print requesting unit, to change the print setup information recorded in the job information storing unit with the part of the print setup information.

2. The print job management apparatus according to claim 1, wherein, in response to a request for changing to substitute print data and corresponding second identifier associated with substitute print data, the print data recorded in the job information storing unit are updated by the substitute print data.

3. The print job management apparatus according to claim 1, wherein, in response to a request for deleting one of the first identifiers from the print requesting unit, the print setup information associated with the one of the first identifiers and the print data associated with the second identifier corresponding to the one of the first identifiers from the job information storing unit.

4. The print job management apparatus according to claim 1, wherein, the print setup information and the print data which are returned to the image forming apparatus are not deleted from the job information storing unit.

5. The print job management apparatus according to claim 1, wherein the job registering unit does not record the print setup information and the corresponding data to the job information storing unit when the print setup information does not satisfy a predetermined standard.

6. A print job management system including an image forming apparatus and a client terminal having a print requesting unit, a job information storing unit, and a print job management program embodied by a computer included in the client terminal, wherein the print job management program causes the computer to execute a method comprising:

in response to a request of the print requesting unit for registering print jobs including print setup information and print data, registering jobs associating the print setup information with first identifiers, associating the print data with second identifiers formed by adding predetermined symbols to the first identifiers, recording the print setup information and the print data in the job information storing unit, and returning the first identifiers to the print requesting unit;

providing a job list, in response to a request of the image forming apparatus for acquiring a list of the print jobs, to return a list of the first identifiers;

transferring the jobs, in response to a request for acquiring the print job corresponding to one of the first identifiers selected from the list by the image forming apparatus, to return the print setup information associated with the requested one of the first identifiers and the print data associated with the second identifiers corresponding to the requested one of the first identifiers; and changing the jobs, in response to a request for changing at least a part of the print setup information associated with the first identifier which is received from the print requesting unit, to change the print setup information recorded in the job information storing unit with the part of the print setup information.

7. The print job management system according to claim 6, wherein, in response to a request for changing to substitute print data and corresponding the second identifier associated with the substitute print data, the print data recorded in the job information storing unit are updated by the substitute print data.

8. The print job management system according to claim 6, wherein, in response to a request for deleting one of the first identifiers from the print requesting unit, the print setup information associated with the one of the first identifiers and the print data associated with the second identifier corresponding to the one of the first identifiers from the job information storing unit.

9. The print job management system according to claim 6, wherein the print setup information and the print data which are returned to the image forming apparatus are not deleted from the job information storing unit.

10. The print job management system according to claim 6, wherein the print setup information and the corresponding data are not recorded into the job information storing unit when the print setup information does not satisfy a predetermined standard.

11. A print job management method used in a system including an image forming apparatus and a client terminal having a print requesting unit, a job information storing unit, and a print job management program embodied by a computer included in the client terminal, the print job management method comprising:

registering jobs, in response to a request of the print requesting unit for registering print jobs including print setup information and print data, to associate the print setup information with first identifiers, associate the print data with second identifiers formed by adding predetermined symbols to the first identifiers, record the print setup information and the print data in the job information storing unit, and return the first identifiers to the print requesting unit;

providing a job list, in response to a request of the image forming apparatus for acquiring a list of the print jobs, to return a list of the first identifiers;

transferring the jobs, in response to a request for acquiring the print job corresponding to one of the first identifiers selected from the list by the image forming apparatus, to return the print setup information associated with the requested one of the first identifiers and the print data associated with the second identifiers corresponding to the requested one of the first identifiers; and changing the jobs, in response to a request for changing at least a part of the print setup information associated with the first identifier which is received from the print requesting unit, to change the print setup information recorded in the job information storing unit with the part of the print setup information.

12. The print job management method according to claim 11, in response to a request for changing to substitute print data and corresponding second identifier associated with substitute print data, updating the print data recorded in the job information storing unit by the substitute print data.

13. The print job management method according to claim 11, in response to a request for deleting one of the first identifiers from the print requesting unit, the print setup information associating with the one of the first identifiers and the print data associating with the second identifier corresponding to the one of the first identifiers from the job information storing unit.

14. The print job management method according to claim 11, wherein, the print setup information and the print data which are returned to the image forming apparatus are not deleted from the job information storing unit.

15. The print job management method according to claim 11, the print setup information and the corresponding data are not recorded into the job information storing unit when the print setup information does not satisfy a predetermined standard.

* * * * *